Oct. 9, 1956
J. H. J. MARTIN
2,765,574
FISH LURE
Filed July 8, 1952
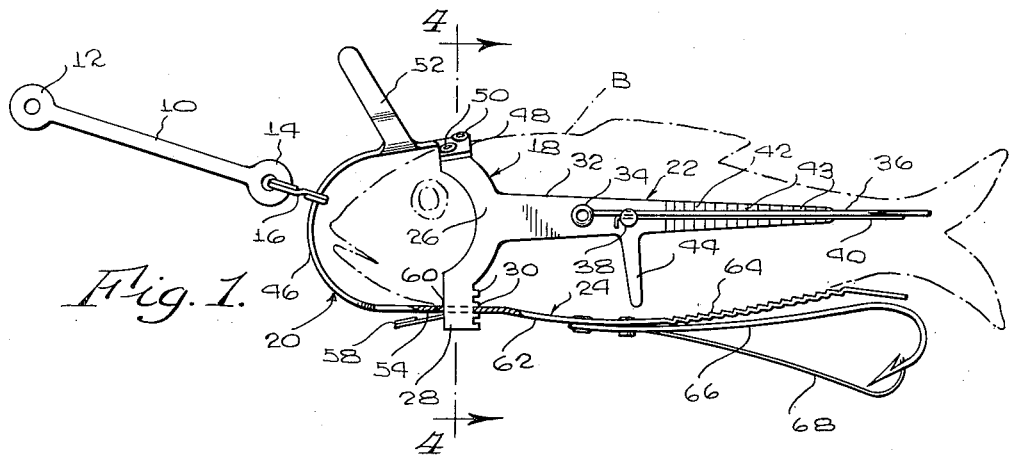
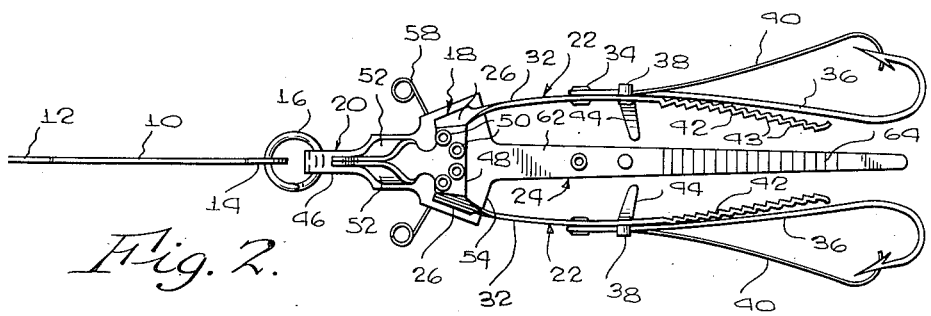
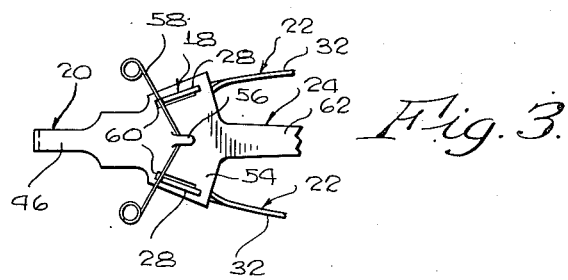
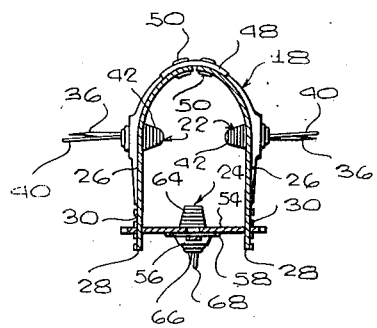
INVENTOR.
Joseph H. J. Martin
BY
McMorrow, Berman & Davidson
Attorneys

—

2,765,574

FISH LURE

Joseph H. J. Martin, Buffalo, N. Y.

Application July 8, 1952, Serial No. 297,633

2 Claims. (Cl. 43—44.4)

This invention relates to fish lures. More particularly, the invention has reference to a fish lure of the type comprising a harness for a live bait.

The advantages of using live bait, under certain circumstances, are well known among fishermen, and I am aware of devices which have previously been conceived, that are in the nature of harnesses for live baits.

However, the main object of the present invention is to provide a generally improved type of harness for a live bait, and among more specific objects of the invention are the following:

First, to provide a harness for a live bait which will be adjustable as to the transverse area thereof, for fitting of the harness to baits of varying thicknesses;

Second, to provide a harness as described which can be readily formed from inexpensive parts capable of being readily stamped or cut to shape in quantity production, and additionally capable of being assembled with one another easily and at minimum cost;

Third, to provide a harness which will be novelly designed in a manner that will be peculiarly effective for gripping the bait securely, while at the same time not injuring the bait or constricting the bait unduly, thus to keep the bait alive for a maximum period of time; and Fourth, to provide a harness as stated which can be swiftly circumposed about or removed from the bait.

In its broadest aspects, the present invention comprises a generally U-shaped yoke adapted to be circumposed about the body of a live bait and having a pair of legs extending downwardly along opposite sides of the bait. A spring loop is disposed in a plane approximately normal to that in which the yoke lies, and is positioned forwardly of the yoke to embrace the head of the bait. The spring loop is connected fixedly at one end to the bight of the yoke, the other end of the spring loop being interposed between the depending ends of the legs and being adjustable along the legs, so as to vary the distance between the opposite ends of the loop and thus permit the harness to be engaged with live baits of different transverse thicknesses or sizes. Side retaining arms are secured to the respective legs of the yokes and are adapted to extend longitudinally of opposite sides of the bait in gripping engagement therewith, and a bottom retaining arm is arranged as an extension of the adjustable end of the loop, so as to be shifted jointly with said adjustable end of the loop toward the side retaining arms, the bottom retaining arm being adapted to extend longitudinally of the underside of the bait in gripping engagement therewith. The several arms are equipped with hooks, the arms being provided with weed guards for precluding fouling of the lure and the harness also being provided with suitable stabilizing means and means for connection to a fishing line.

Other objects will appear from the following description, the claims appended thereto, and from the annexed drawing, in which like reference characters designate like parts throughout the several views, and wherein:

Figure 1 is a side elevational view of a harness formed in accordance with the present invention, a live bait to which the harness is applied being shown in dotted lines, part of the harness being shown in longitudinal section;

Figure 2 is a top plan view;

Figure 3 is a bottom plan view in which the arms are illustrated fragmentarily; and Figure 4 is a transverse sectional view taken substantially on line 4—4 of Figure 1.

Referring to the drawings in detail, the reference numeral 10 has been applied to a connecting member having an eyelet 12 at its front end and a second eyelet 14 at its rear end. The connecting member 10 is adapted to permit attachment of the harness constituting the present invention to a fishing line, as shown, it being understood that the fishing line or leader would be attached to the front eyelet 12.

Loosely engaged in the rear eyelet 14 is a connecting ring 16, which can be readily formed from a length of thin wire material formed to a circular configuration. It will be noted that the ring 16 is so connected to the connecting member 10 as to provide a universal connection of the harness to said connecting member.

The main components of the harness constituting the present invention comprise a yoke designated generally by the reference numeral 18, a spring arch designated generally at 20, side retaining arms designated generally at 22, and a bottom retaining arm designated generally at 24.

Considering first the construction of the yoke 18, said yoke is of inverted U-shape and has a pair of legs 26 of identical, though opposite construction, said legs being arranged to extend downwardly along opposite sides of a bait B to which the harness is applied, intermediate the opposite ends of said bait.

As will be noted, the upper ends of the legs 26 (see Figure 4) are extended toward one another in slightly converging relation, at the bight of the yoke 18, so as to cause the yoke to straddle the bait B when the harness is applied to said bait.

Intermediate their opposite ends, the legs 26 are curved longitudinally as best shown in Figure 1, to provide a clearance for the eyes of the bait.

The lower ends 28 of the legs 26 are of straight formation, the project downwardly below the bait in parallel relation. In the trailing edges of said lower ends 28, I form a longitudinal series of notches defining spaced teeth 30.

Integral with the trailing edges of the rearwardly indented medial portions of the legs 26 are side retaining arms 22, each of said arms having a relatively wide forward end portion 32 integral with its associated leg 26, and taper to their rear ends.

Provided near the forward end portions 32 of the side retaining arms 22 are rivets 34, said rivets being spaced rearwardly from the legs 26 and connect the eyes of hooks 36 to the respective arms 22. The hooks 36, as will be noted from Figure 1, are disposed longitudinally of the side retaining arms 22, the barbed ends of the hooks projecting beyond the free rear ends of said retaining arms.

In close proximity to the rivets 34 are rivets 38 or equivalent fastening elements, that secure to the arms 22 the inner ends of flexible weed guards 40, said weed guards constituting means precluding fouling of the hooks 36 during use of the lure.

The rear end portions 42 of the arms 22 are formed with a longitudinal series of undulations or corrugations 43, to cause the arms 22 to grip efficiently the body of the bait B when the harness is applied to the bait.

Integral with the respective arms 22, intermediate the opposite ends of said arms, are spacer arms 44, said spacer arms extending downwardly from their associated retaining arms 22 and converging toward their free ends as shown in Figure 2.

Considering now the construction of the spring arch 20, said arch is formed as an arcuate body 46 disposed in a plane approximately normal to the plane in which the yoke 18 is disposed, thus to permit said arch to embrace the head of the bait B, with one end of the arcuate body overlying the head and the other end of said body underlying the head.

Formed upon the first-named end of the arch is a cross member 48, that overlies and is in contact with the bight portion of the yoke 18 (Figure 4), rivets 50 or equivalent fastening element being employed to fixedly connect said cross member thereto. Adjacent the cross member 48, the arch 46 is integrally formed with prong members 52, said prong members converging upwardly toward their free ends, and being inclined in a direction toward the front end of the harness. The convergent ends of the prong members are in longitudinal contact with one another, to provide a prong that will cooperate with the weed guards 40 in preventing fouling of the lure.

At its other end, the arch 46 is widened as at 54 (Figure 3) and intermediate the opposite side edges of the widened lower end 54, there is formed a struck-out tab 56 engaging the medial portion of a stabilizer member. The stabilizer member is preferably formed from a single piece of wire material formed in the shape of a wide V, the arms 58 of said stabilizer member projecting outwardly beyond the opposite sides of the harness in a manner best shown in Figures 2 and 3. At their free ends, the respective arms 58 of the stabilizer member are formed with loops, this construction being found particularly effective in stabilizing the lure during the use thereof.

Contiguous to the opposite side edges of the widened lower end portion 54 of the spring arch, I form rearwardly diverging slots 60, said slots receiving the depending lower or free ends 28 of the legs 26. As will be noted from Figure 1, the teeth 30 are engageable with the walls of the respective slots 60, thus to permit the lower end of the spring arch 20 to be adjusted along the legs 26, toward and away from the upper end of said spring arch.

By reason of this construction, the distance between the opposite ends of the spring arch can be varied, thus to accommodate the harness to baits B of different transverse thicknesses or sizes.

The bottom retaining arm 24 is formed as an integral extension of the widened lower end 54 of the spring arch 20, and is similar in construction to the arms 22. Thus, the bottom retaining arm 24 is formed with a generally flat forward end portion 62, merging into a longitudinally corrugated rear end portion 64 that is adapted to extend lengthwise of and grip the underside of the bait B. A hook 66 is fixedly connected to the inner end portion 62 by a suitable rivet or equivalent fastening element, and associated with said hook 66 is a weed guard 68.

In use, the free ends of the legs 26 are urged forwardly within their associated slots 60, to disengage the teeth 30 from the walls of the slots. This permits the lower end of the spring arch 20 to be urged outwardly of the yoke, thus to permit the extension of the head portion of a bait B into the yoke. When the bait has been properly positioned, the lower end portion 54 of the spring arch 20 is pressed upwardly against the underside of the bait, and the teeth 30 of the respective ends 28 of the legs 26 are engaged with the walls of the slots 60, thus to cause the bait B to be gripped securely by the harness.

The device is now ready for use, and as will be noted, the retaining arms 22, 24 respectively will extend longitudinally of the bait B, and will securely grip the bait so as to keep the bait properly positioned relative to the harness. In this connection, the spacer arms 44 are employed for the purpose of limiting movement of the retaining arm 24 toward the retaining arms 22, and also serve the purpose of preventing the body of the bait B from slipping out of engagement with the arms 22, 24.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a live bait holder, a yoke comprising an inverted U-shaped member having a bight portion and depending legs having free lower ends, bait retaining side arms having forward ends secured to said legs and free rear ends, a spring arch having an upper end portion secured to said bight portion and a lower end portion, an element fixed on said lower end portion, and teeth on and extending along the free lower ends of said legs and selectively engageable with portions of said element to hold said spring arch under adjusted tension.

2. In a live bait holder, a yoke comprising an inverted U-shaped member having a bight portion and depending legs having free lower ends, bait retaining side arms having forward ends secured to said legs and free rear ends, a spring arch having an upper end portion secured to said bight portion and a lower end portion, an element fixed on said lower end portion, and teeth on and extending along the free lower ends of said legs and selectively engageable with portions of said element to hold said spring arch under adjusted tension, and a bottom retaining arm having a forward end secured to said element and a free rear end.

References Cited in the file of this patent

UNITED STATES PATENTS

| 889,505 | Bingenheimer | June 2, 1908 |

FOREIGN PATENTS

| 23,457 | Great Britain | 1894 |
| 147,394 | Great Britain | July 22, 1920 |
| 149,387 | Austria | June 21, 1937 |
| 482,271 | Canada | Apr. 8, 1952 |